Sept. 20, 1966          O. DELAND          3,273,549
INTERNAL COMBUSTION ENGINE CARBURETOR HAVING A FAN
Filed Nov. 18, 1963
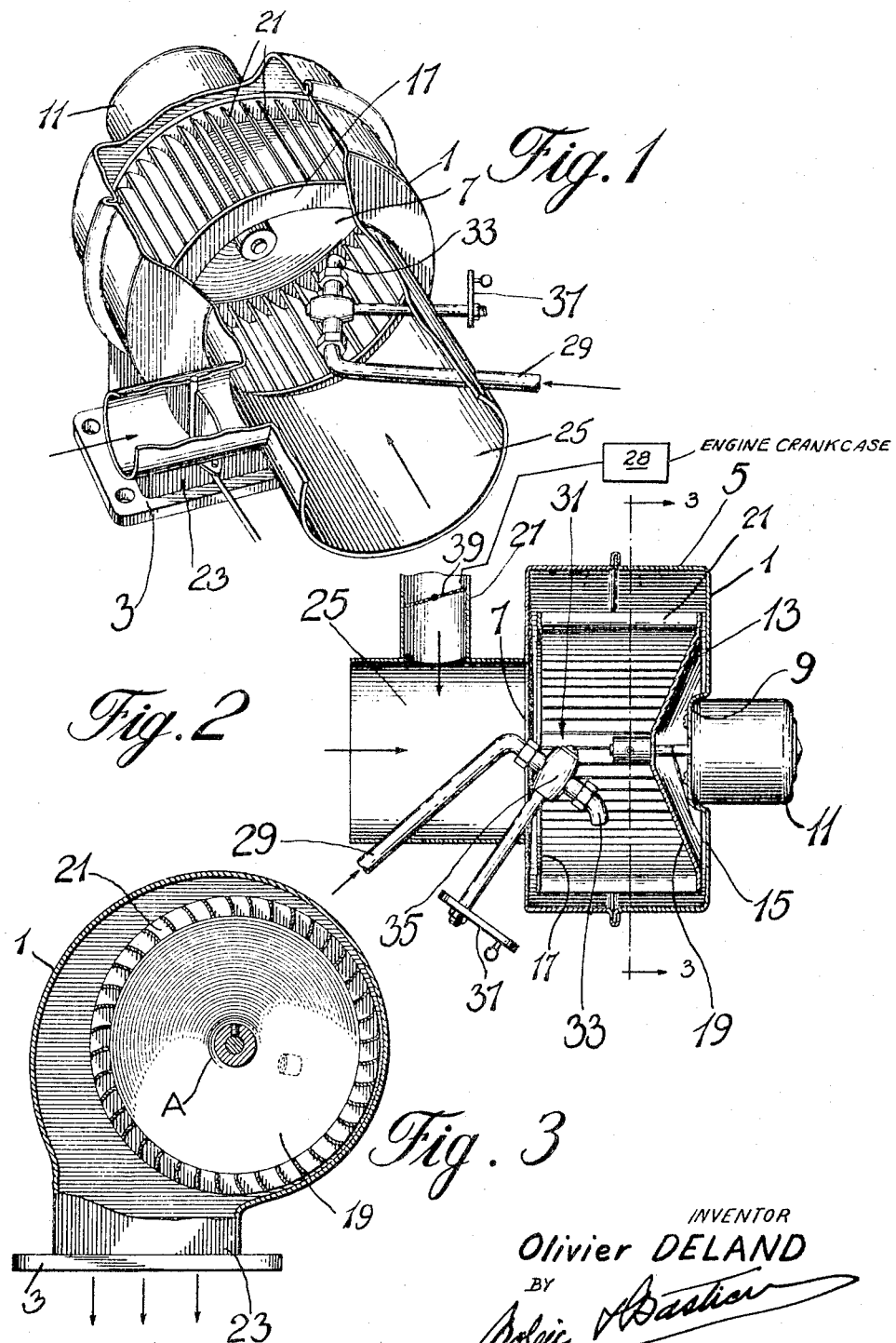
INVENTOR
Olivier DELAND
BY
ATTORNEYS

United States Patent Office 3,273,549
Patented Sept. 20, 1966

3,273,549
INTERNAL COMBUSTION ENGINE CARBURETOR
HAVING A FAN
Olivier Deland, L'Acadie, St. Jean, Quebec, Canada
Filed Nov. 18, 1963, Ser. No. 324,429
9 Claims. (Cl. 123—119)

The instant invention relates to a new carburetor or supercharger for the supply of a mixture of air, vaporized and liquid fuel to a combustion engine.

In internal combustion engines, particularly partially worn out engines, part of the gasoline injected into the cylinders finds its way, unburnt and vaporized, into the crankcase around the piston from where they escape through the breather tube. This is an appreciable waste of gasoline, particularly considering that it then is heated enough to be vaporized. Such wasted gasoline could be used to advantage in the carburetor to be mixed with air and other fresh fuel.

The main object of the present invention therefore consists in improving the efficiency of the present carburetor for combustion engines by making it possible to provide, to such engines, a warmer and cheaper supply of air and fuel mixture by making use of the unburnt fuel in the crankcase.

A further object of the invention resides in the provision of such a carburetor wherein the fuel is highly atomized as it is mixed with air so that the mixture becomes quite volatile before it is directed to the engine and thus can be ignited more easily and burnt more thoroughly.

Another important object lies in providing a carburetor of the above type which is a compact unit that can be manufactured cheaply and can be serviced easily, being made of a few number of simple parts.

The above advantages and objects of the invention are attained in a carburetor for supplying a mixture of air and liquid fuel to a combustion engine made according to the invention which comprises: a fan having a central impeller provided with a series of peripheral blades, the fan having an air inlet means, which includes a hot gaseous fluid supply passage, mounted to discharge within the central impeller and a liquid fuel supply means which is mounted in such a way as to deliver the fuel into the impeller and against the blades to be atomized thereby. The hot gaseous fluid supply passage, which supply partly serves to heat the cold air supply, is connected to the breather tube of the engine crankcase or the filling tube thereof in order to capture the unburnt fuel which has seeped around the pistons.

A better understanding of the invention will be made possible by the description that follows of a specific embodiment of the invention, which description relates to the appended drawings wherein:

FIG. 1 is a perspective view of the carburetor of the invention with part of the casing being broken away to illustrate the internal structure of the carburetor;

FIG. 2 is a cross-sectional view of the carburetor;

FIG. 3 is also a cross-sectional view, taken along line 3—3 of FIG. 2.

The carburetor is generally formed of a centrifugal fan having an outer casing 1 and a mixture outlet base 3 to be secured to the fuel intake manifold of the combustion engine 28. Part of the casing is formed as a volute 5 having, on one side thereof, a central air inlet opening 7 and on the opposite side, a motor bracket 9 of suitable shape to solidly hold a driving motor 11. Within volute casing 5 and mounted on motor shaft 15 is a hollow cylindrical impeller generally denoted by numeral 13, which is formed of a ring 17 and in spaced relationship therewith an inwardly concave radial side plate 19 fixedly secured to motor shaft 15. Ring 17 and the side plate 19 are held apart by a series of peripheral blades 21, closely spaced and curved slightly in the direction of rotation of the impeller. It will be noted that blades 21 are of small radial extent and that the impeller is adapted to draw air from opening 7 and to discharge it through the outlet passage 23 around which is located the previously mentioned base 3.

A main air inlet passage 25 is mounted around the air inlet opening 7 while a vaporized fuel inlet passage 27 is connected to the crankcase of the engine, above the oil, as shown schematically at 28. The incoming main air is therefore mixed with unburned vaporized fuel from the crankcase. Air inlet passage 25 is opened to atmosphere through the usual air filter.

The fuel supply means is composed of a fuel pipe 29 angularly mounted within inlet passage 25 in the direction of the air inlet opening 7 and is formed with a bent end 31 at the extremity of which is a fuel outlet nozzle 33. A fuel control cock 35 is mounted on the supply means upstream of nozzle 33 to control the flow of fuel into the impeller. A lever arm 37 serves here to illustrate a standard control and actuating mechanism for cock 35.

The fuel nozzle, as more particularly illustrated in FIG. 1, is directed in such a way as to cause the fuel to impinge on the rotating impeller blades 21 and, preferably, against the direction of rotation of the said impeller so that the fuel may be more fully broken up into tiny particles and carried into the air flow to form a highly volatile mixture.

Finally, a butterfly valve 39 should be provided in the hot fuel inlet passage 27 to control the amount of hot fuel to be mixed with the air coming in from the air inlet passage 25 independently of the piston action.

The device just described has the advantage of not only providing a warmer mixture to the combustion engine but the particular positioning of the fuel nozzle and the presence of the rapidly rotating impeller and closely spaced blades 21 will cause high atomization of the fuel and consequently a mixture which will much more readily and completely ignite and burn. It would have considerable advantage over the present day practice of using a spray nozzle which has very little atomizing power in view of the small pressure behind the fuel. In the carburetor of the invention, the fuel can be rightly said to be pulverized.

A substantial economy is also obtained by recuperating the unburnt gasoline from the crankcase.

I claim:

1. In combination, a combustion engine having a crankcase and a carburetor, comprising: a centrifugal fan having a casing and an impeller rotatably mounted therein and formed with blades at its periphery; an air inlet passage discharging at the center of said impeller; an unburnt vaporized fuel inlet passage connected to the crankcase of the engine and discharging into said air inlet passage and a fuel supply means adapted to discharge liquid fuel inwardly of said impeller and against said blades whereby the fuel may be atomized thereby and thoroughly mixed with the incoming air and unburnt fuel mixture.

2. A carburetor for supplying a mixture of air, vaporized and liquid fuels to a combustion engine, comprising: a centrifugal fan having a volute casing and an impeller rotatably mounted therein and formed with a series of longitudinal blades distributed around the periphery of ized fuel into said air inlet to warm the air entering said casing and opening centrally inwardly of the impeller; an unburnt vaporized fuel inlet passage discharging into said cold air inlet passage; liquid fuel supply means having a discharge nozzle mounted to discharge fuel within the impeller and against said blades whereby the fuel may be atomized by the rotary impeller and thoroughly mixed with the air from said passages.

3. A carburetor for supplying a mixture of air, vaporized and liquid fuels to a combustion engine comprising: a fan having a rotary impeller formed with peripheral blades and a main air inlet; means discharging hot vaporized fuel into said air inlet to warm the air entering said fan and liquid fuel inlet means discharging fuel centrally of said rotary impeller on said blades so as to be atomized thereby.

4. A carburetor for supplying a mixture of air, vaporized and liquid fuels to a combustion engine comprising: a fan having a generally cylindrical impeller provided with peripheral blades and an end opening; a main air inlet adapted to discharge into said opening; means discharging hot vaporized fuel into said air inlet to warm the air entering said end opening and liquid fuel inlet means adapted to discharge fuel centrally of said rotary impeller on said blades so as to be atomized thereby.

5. A carburetor for supplying a mixture of air, vaporized and liquid fuels to a combustion engine, comprising: a centrifugal fan having a volute casing and a generally cylindrical hollow impeller rotatably mounted within said casing; said impeller being provided with peripheral closely and evenly spaced longitudinal blades and an end opening; a main air inlet passage connected to said casing to discharge into said end opening; a hot vaporized fuel inlet passage discharging into said air inlet passage to warm the air delivered to said impeller; liquid fuel supply means having a discharge nozzle mounted to deliver fuel in the impeller and against said blades whereby the fuel may be atomized by the rotary impeller and thoroughly mixed with the air and vaporized fuel of said passages.

6. A carburetor as claimed in claim 5 wherein said blades are curved in the direction of rotation of the impeller.

7. A carburetor as claimed in claim 5 wherein said liquid fuel discharge nozzle is oriented to deliver fuel in a general direction opposed that of rotation of the impeller to increase the breaking power of the blades.

8. A carburetor as claimed in claim 5 wherein said hot fuel inlet passage is provided with a flow control butterfly valve.

9. In combination, a combustion engine having a crankcase and a carburetor, comprising: a fan having a central rotary impeller provided with peripheral blades; inlet means including a vaporized fuel passage connected to said crankcase and an air supply passage mounted to discharge within said central impeller and liquid fuel supply means mounted to deliver fuel into said impeller and against said blades to be atomized thereby.

References Cited by the Examiner

UNITED STATES PATENTS

| | | | |
|---|---|---|---|
| 1,950,586 | 3/1934 | Zubaty | 123—119 |
| 1,979,747 | 11/1934 | Kenneweg. | |
| 2,271,150 | 1/1942 | Dressler. | |
| 2,437,183 | 3/1948 | Berg. | |
| 2,622,391 | 12/1952 | Lindeman. | |
| 2,653,591 | 9/1953 | Cole et al. | |

FOREIGN PATENTS 778,646    7/1957    Great Britain.

HARRY B. THORNTON, *Primary Examiner.*

R. R. WEAVER, *Assistant Examiner.*